United States Patent [19]

De Luca et al.

[11] 3,879,548

[45] Apr. 22, 1975

[54] METHOD OF TREATING MILK FEVER IN DAIRY CATTLE WITH 1-ALPHA-HYDROXYCHOLECALCIFEROL

[75] Inventors: Hector F. De Luca, Madison; Neal A. Jorgensen, Middleton, both of Wis.

[73] Assignee: Wisconsin Alumni Research Foundation, Madison, Wis.

[22] Filed: Jan. 21, 1974

[21] Appl. No.: 435,099

[52] U.S. Cl. .................................................. 424/236
[51] Int. Cl. .......................................... A61k 27/00
[58] Field of Search .................................... 424/236

[56] References Cited

UNITED STATES PATENTS

| | | | |
|---|---|---|---|
| 3,646,203 | 2/1972 | De Luca | 424/236 |
| 3,741,996 | 6/1973 | De Luca et al. | 260/397.2 |

*Primary Examiner*—Sam Rosen
*Attorney, Agent, or Firm*—Howard W. Bremer

[57] ABSTRACT

A method of treatment and prophylaxsis for milk fever in dairy cattle which comprises internally administering to the cattle 1α-hydroxycholecalciferol.

4 Claims, No Drawings

METHOD OF TREATING MILK FEVER IN DAIRY CATTLE WITH 1-ALPHA-HYDROXYCHOLECALCIFEROL

This invention relates to a method of treatment and prophylaxsis for milk fever disease in dairy cattle using 1α-hydroxycholecalciferol.

Milk fever (parturient paresis) is a metabolic disease of dairy cows in which the cows fail to absorb or mobilize enough calcium at the time of parturition to provide for the production of milk. The disease is manifested by a decrease in plasma calcium, usually between six to thirty hours after parturition, to a value so low as to induce tetany with resultant immobilization of the cow. There is also generally an accompanying decrease in the blood phosphate level. As an example, the plasma calcium level in a cow prior to calving is about 10 mg./100 ml. (or 10 mg. percent). Following parturition this level will normally dip to about 7–8 mg. percent but will then rise in a reasonable time to the more normal 10 mg. percent range. In a cow afflicted with milk fever, however, after parturition the plasma calcium may dip more drastically, such as into the 5 mg. percent range, and it is recognized that at such plasma calcium levels the cow will go into tetany. Such low plasma calcium levels are not necessary in all cases to induce milk fever disease and the disease is experienced at substantially higher calcium levels depending upon the individual animal involved. If treatment for such condition is not however immediate and successful there is a real danger that the cow may die or be afflicted with a lasting paralysis, or at the very least that its milk production will be substantially decreased. (See "Milk Fever Causes, Methods of Treatment and Prevention," S. H. Morrison, Vol. 1, No. 2, a publication of Borden Chemical Company and J. M. Payne, Brit. Vet. Assn. "Recent Advances in Our Knowledge of Milk Fever," presented at 87th Annual Congress of the Association, Sept. 6, 1964.)

The incidence of milk fever disease has been estimated to be in the range from about 3.5–5% of the world's dairy cows. In individual herds, however, the incidence may be as high as 60–70%. It appears that the incidence of the disease is highest among high milk producing cows during the third and later lactation periods although at times it has been observed in the second lactation period. In any event, once a cow has had milk fever there is an 80–90% probability that she will again be so afflicted after her next parturition.

Prior to the present invention various methods had been suggested for the treatment of milk fever. For example, feeding of a low calcium diet or feeding a high phosphate in a grain ration, which is tantamount to a low calcium diet, has been suggested as a preventative for the disease. Since, however, it is necessary to feed cattle a high calcium diet during their nonlactating periods to replenish the calcium stores depleted by previous milking such treatment is not a very practical solution for milk fever problem. Other methods of treatment suggested include air inflation of the udder - a treatment not used because of the danger of mastitis and other infection - and acidification of silage which alleviated the disease. This latter method is impractical because of problems engendered by the acid intake.

Currently, the most widely used treatment for milk fever is the administration of vitamin D in massive dosage. For example, in one method the cow is fed 20 million units per day of vitamin D for three to seven days before calving while in another method 10 million units of vitamin D is injected intramuscularly before calving. Although these methods are of value they are associated with potentially high risk and other disadvantages. With administration of such large dosages of vitamin D there is a real danger of vitamin D toxicity and, as a consequence, death of the cow or damage through abnormal calcification of the soft tissues such as the kidney, aorta, etc. Even if the animal survives without damage the milk produced would not be fit for human or calf consumption for some time because of the high content of vitamin D in the milk.

Another method which has been suggested for combatting milk fever disease is through the administration of 25-hydroxycholecalciferol as described in U.S. Pat. No. 3,646,203, issued Feb. 29, 1972. That compound was shown to be effective in reducing the dip in the plasma calcium of cows after parturition.

It has now been found that 1α-hydroxycholecalciferol can be effectively used in the treatment and prevention of milk fever in dairy cattle. When administered to the cows at least about 24 hours prior to calving this compound was found to be even more effective in preventing the drastic dip in plasma calcium in the cows after parturition than 25-hydroxycholecalciferol. (1α-hydroxycholecalciferol is a derivative of vitamin $D_3$ and is more fully described, along with a method for its synthesis in U.S. Pat. No. 3,741,996, issued June 26, 1973.)

In general, it has been found that a dosage of about 100 μg is effective in preventing milk fever when administered to cows at least about 24 hours prior to calving. Where calving did not occur within the estimated period the treatment was repeated every 48 hours until parturition did occur. The dosage is not critical and can be varied depending at least in part upon the size of the animal. In any event the 1α-hydroxycholecalciferol should be administered in amounts sufficient to accomplish the desired treatment or prophylaxsis. Excessive amounts should be avoided as a matter of sound economic practice.

Effective and practical administration of the 1α-hydroxycholecalciferol can be accomplished by injection of the material intravenously, intramuscularly or subcutaneously, while dissolved in a suitable vehicle such as an innocuous oil or propylene glycol. Alternatively the 1α-hydroxycholecalciferol can be compounded with materials to form a bolus, or can be encapsulated, so that it lends itself to oral administration.

The following example is intended to be illustrative of the invention only and not limiting of the appended claims.

EXAMPLE

1α-hydroxycholecalciferol (1α-OH-$D_3$), synthesized in accordance with the procedure in U.S. Pat. No. 3,741,996, was dissolved at a concentration of 50 μg/ml in propylene glycol. 2 ml of this solution was given intravenously at least 24 hours prior to calving, to six randomly selected cows who had experienced three or more calvings with the treatment being repeated every 48 hours until calving occurred. Another six cows from the same group were given no treatment and were considered controls in the experiment. Blood samples were taken from each cow in both the treated and untreated groups each day beginning at the indicated times before, during and after calving for calcium and phosphorous (measured as the phosphate) analysis. The results obtained as measured by the blood calcium and blood phosphorous determinations in mg % are shown in the table below where the 0 hour data represents blood samples taken immediately after calving.

Low blood calcium and phosphorous levels during and after calving are evident in all cows in the control group. In addition, in the control group two cows suffered severe milk fever disease while no milk fever was observed in the treated group.

It is also interesting to make a comparison of the av-

CONTROL COWS (untreated)

Blood calcium (mg%)

| Cow No. | −3 days | −2 days | −1 day | −12 hr. | 0 hr. | +12 hr. | +12 hr. | +1 day | +2 days | +3 days |
|---|---|---|---|---|---|---|---|---|---|---|
| 1907 | 9.3 | 9.3 | 9.6 | 8.6 | 8.2 | 7.8 | 7.4 | 7.0 | | |
| 218 | | 7.9 | 7.7 | | 7.0 | 7.0 | 6.1" | 5.2 | | "milk fever |
| 312 | 8.5 | 8.6 | 8.8 | | 8.4 | 7.1 | 6.6 | 7.0 | | |
| 1917 | 8.4 | 8.4 | 7.9 | 7.9 | 7.1 | 7.1 | 6.8 | 6.9 | 8.4 | |
| 1845 | 8.3 | 8.5 | 8.4 | 8.7 | 6.6 | 8.5 | 8.0 | 8.4 | 8.7 | |
| 1814 | 9.3 | 9.2 | 8.2 | 6.6 | 4.0" | 5.8 | 5.5 | 6.9 | 7.7 | "milk fever |
| Average | 8.8 | 8.7 | 8.4 | 8.0 | 6.9 | 7.2 | 6.7 | 6.9 | 8.3 | |

Blood phosphate (mg%)

| Cow No. | −3 days | −2 days | −1 day | −12 hr. | 0 hr. | +12 hr. | +12 hr. | +1 day | +2 days | +3 days |
|---|---|---|---|---|---|---|---|---|---|---|
| 1907 | 5.2 | 5.5 | 4.1 | 4.1 | 3.9 | 4.3 | 4.0 | 4.1 | | |
| 218 | | 7.3 | 6.7 | | 5.5 | 5.5 | 6.8" | 7.7 | | "milk fever |
| 312 | 7.4 | 6.2 | 7.4 | | 7.0 | 6.1 | 5.3 | 5.4 | | |
| 1917 | 5.0 | 5.3 | 4.8 | 4.5 | 4.4 | 4.5 | 2.4 | 2.1 | 4.8 | |
| 1845 | 7.6 | 7.2 | 5.9 | 5.3 | 3.8 | 6.7 | 2.8 | 6.2 | 5.7 | |
| 1814 | 6.7 | 7.3 | 4.2 | 3.6 | 2.1" | 4.1 | 3.7 | 4.2 | 4.3 | "milk fever |
| Average | 6.4 | 6.5 | 5.5 | 4.4 | 4.5 | 5.2 | 4.2 | 5.0 | 4.9 | |

COWS TREATED WITH 1α-OH-$D_3$

Blood calcium (mg%)

| Cow No. | −3 days | −2 days | −1 day | −12 hr. | 0 hr. | +12 hr. | +1 day | +2 days | +3 days |
|---|---|---|---|---|---|---|---|---|---|
| 368 | 9.3 | 9.8 | 10.8 | 10.7 | 9.8 | 9.7 | 9.9 | 9.5 | 9.9 |
| 1929 | 9.2 | 9.3 | 10.5 | 10.4 | 9.4 | 9.5 | 9.2 | 8.2 | 7.7 |
| 291 | 9.2 | 10.6 | 9.4 | 9.7 | 8.5 | 9.5 | 9.0 | 7.9 | 7.5 |
| 1892 | 10.1 | 10.5 | 8.4 | 9.3 | 9.3 | 8.7 | 8.7 | 9.7 | 8.6 |
| 1851 | 9.8 | 10.2 | 8.5 | 10.4 | 8.0 | 9.7 | 7.7 | 9.2 | 8.9 |
| 301 | 6.9 | 8.2 | 9.4 | 8.1 | 7.8 | 8.6 | 8.4 | 8.1 | 8.3 |
| Average | 9.1 | 9.7 | 9.5 | 9.8 | 8.8 | 9.3 | 8.8 | 8.8 | 8.5 |

Blood phosphate (mg%)

| Cow No. | −3 days | −2 days | −1 day | −12 hr. | 0 hr. | +12 hr. | +1 day | +2 days | +3 days |
|---|---|---|---|---|---|---|---|---|---|
| 368 | 9.4 | 8.3 | 7.9 | 10.3 | 6.7 | 7.7 | 7.3 | 6.7 | 7.4 |
| 1929 | 8.2 | 8.9 | 8.2 | 9.1 | 8.5 | 10.8 | 7.9 | 6.8 | 7.7 |
| 291 | 5.6 | 8.5 | 7.4 | 7.3 | 8.0 | 8.9 | 8.0 | 8.6 | 8.6 |
| 1892 | 6.8 | 6.8 | 6.0 | 6.9 | 5.9 | 8.7 | 7.1 | 6.6 | 5.2 |
| 1851 | 9.0 | 9.7 | 7.8 | 8.8 | 6.1 | 8.4 | 5.5 | 5.8 | 4.4 |
| 301 | 5.8 | 5.9 | 7.1 | 3.4 | 5.7 | 7.4 | 7.2 | 5.0 | 3.8 |
| Average | 7.5 | 8.0 | 7.4 | 7.6 | 6.8 | 8.7 | 7.2 | 6.6 | 6.2 |

Cow No. 368: 1α injected: 10-30, 7:30 a.m. and 11-1, 8:00 a.m. calved 11-2, 2:30 a.m.
Cow No. 1929: 1α injected: 10-30, 7:30 a.m. calved 11-1, 9:30 a.m.
Cow No. 291: 1α injected: 11-2, 2 p.m. and 11-4, 8 p.m. calved 11-5, 2 a.m.
Cow No. 1892: 1α injected: 12-3, 8 a.m.; 12-5, 8 a.m. and 12-7, 8 a.m. calved 12-7, 6 p.m.
Cow No. 1851: 1α injected: 12-24, 10 a.m.; 12-26, 10 a.m.; 12-28, 10 a.m. and 12-30, 10 a.m. calved 1/1, 8:30 a.m.
Cow No. 301: 1α injected: 1/1, 4 p.m. and 1/3, 4 p.m. calved 1/5, 4 p.m.

erage values of calcium and phosphorous in the treated and untreated animals. The marked ability of the 1α-OH-$D_3$ to prevent the dip in blood calcium and phosphorous levels of cows during and after calving is evident from the table below.

| Cow No. | −3 days | −2 days | −1 day | −12 hr. | 0 hr. | +12 hr. | +1 day | +2 days | +3 days |
|---|---|---|---|---|---|---|---|---|---|
| Difference between groups: | | | | | | | | | |
| | | | | | Calcium Mg% | | | | |
| Treated | 9.1 | 9.7 | 9.5 | 9.8 | 8.8 | 9.3 | 8.8 | 8.8 | 8.5 |
| Control | 8.8 | 8.7 | 8.4 | 8.0 | 6.9 | 7.2 | 6.7 | 6.9 | 8.3 |
| Diff. | 0.3 | 1.0 | 1.1 | 1.8 | 1.9 | 2.1 | 2.1 | 1.9 | 0.2 |
| | | | | | Phosphorus Mg% | | | | |
| Treated | 7.5 | 8.0 | 7.4 | 7.6 | 6.8 | 8.7 | 7.2 | 6.6 | 6.2 |
| Control | 6.4 | 6.5 | 5.5 | 4.4 | 4.5 | 5.2 | 4.2 | 5.0 | 4.9 |
| Diff. | 1.1 | 1.5 | 1.9 | 3.2 | 2.3 | 3.5 | 3.0 | 1.6 | 1.3 |

It is apparent from the foregoing that 1α-hydroxycholecalciferol is effective in maintaining blood calcium and phosphorous values near normal after calving and in preventing milk fever disease.

Having thus described the invention what is claimed is:

1. The method of treatment and prophylaxsis for milk fever disease in dairy cattle which comprises internally administering to the cattle 1α-hydroxycholecalciferol in an amount sufficient to induce said treatment and prophylaxsis.

2. The method of claim 1 in which the treatment comprises administering about 100 μg of 1α-hydroxycholecalciferol to each cow at least one day prior to calving.

3. The method of claim 1 in which the treatment is by injection.

4. The method of claim 1 in which the treatment is oral.

* * * * *